June 6, 1950 "R" L. HOLLINGSWORTH 2,510,889

ANTIFADE CARRIER WAVE RECEIVING ARRANGEMENT

Filed Jan. 16, 1946 2 Sheets-Sheet 1

INVENTOR.
"R" LEE HOLLINGSWORTH

BY John J. Rogan
ATTORNEY

ANTIFADE CARRIER WAVE RECEIVING ARRANGEMENT

Filed Jan. 16, 1946 2 Sheets-Sheet 2

"R" LEE HOLLINGSWORTH
INVENTOR.
BY John J. Rogan
ATTORNEY

Patented June 6, 1950 2,510,889

UNITED STATES PATENT OFFICE 2,510,889

ANTIFADE CARRIER WAVE RECEIVING ARRANGEMENT

"R" Lee Hollingsworth, West Hempstead, N. Y., assignor to Press Wireless, Inc., New York, N. Y., a corporation of Delaware Application January 16, 1946, Serial No. 641,589

6 Claims. (Cl. 250—20)

This invention relates to the reception of carrier wave energy and more particularly to methods of reducing the effects of selective fading in such systems.

In one known method of carrier wave reception, selective fading of the received carrier wave energy has been reduced by employing a local oscillator at the receiver which is used to insert an artificial carrier frequency. Systems of this type have been generally referred to as carrier insertion systems. The success of such systems is dependent upon the ability to synchronize or lock the frequency of the local carrier source with the frequency of the received carrier energy. I have found that when, in such systems, the amplitude of the received carrier wave is below a certain minimum, it is not feasible to synchronize the local carrier oscillator with the received carrier frequency and that such lack of control results in undesirable beats and other forms of distortion in the output of the receiver.

Accordingly, it is a principal object of this invention to provide an arrangement whereby the desirable effects of carrier insertion can be obtained without at the same time introducing distortion when the received carrier wave energy drops below a certain minimum level.

It is another object of this invention to provide circuit arrangements for substantially reducing the effects of selective fading in carrier wave receiving systems by using an artificially inserted carrier at the receiver only so long as the level of the received carrier energy is above a predetermined minimum value.

A further object of the invention is to provide a receiver for receiving radio carrier signals which improves the reception qualities so far as energy transmitted from a distant source is concerned when the receiver is located in what is known as the secondary service area of a broadcast transmitter.

Another object of the invention relates to a radio receiving system of the carrier insertion type having means for automatically disabling the source of local carrier under control of the degree of fading which the carrier undergoes in transmission to the receiver.

Another principal object of the invention is to provide an improved system of carrier wave reception utilizing the diversity principle.

A feature of the invention relates to a radio receiver of the local carrier insertion type having means for disabling the local carrier source when the received carrier energy drops below a value sufficient to synchronize the local carrier source therewith.

Another feature of the invention relates to a diversity receiving system employing a plurality of diversity receiving channels, each of which is of the artificial carrier insertion type in conjunction with means for automatically disabling the local carrier source in each channel when the level of the received carrier in any given channel drops below a predetermined minimum. As a result of this feature the diversity effect in the commonly excited amplifier for the diversity channels is increased and without producing the effects of undesirable beats which tend to occur when insufficient carrier energy is received to control the local carrier insertion oscillator associated with any given channel.

A still further feature relates to a radio receiving arrangement of the diversity type employing artificially inserted local carriers for the several diversity receiving channels in conjunction with a single automatic volume control rectifier which enhances the diversity effect by insuring with a greater degree of certainty that only the channel receiving the strongest signal controls the output of the common amplifier or detector.

A further feature relates to an improved level control arrangement of the so-called amplified automatic volume control type.

A still further feature relates to the novel organization, arrangement and relative interconnection of parts which cooperate to provide an improved carrier frequency receiving system.

Other objects and advantages not particularly enumerated will be apparent after a consideration of the following detailed descriptions and the appended claims.

In the drawing which shows certain representative embodiments:

Figure 1:
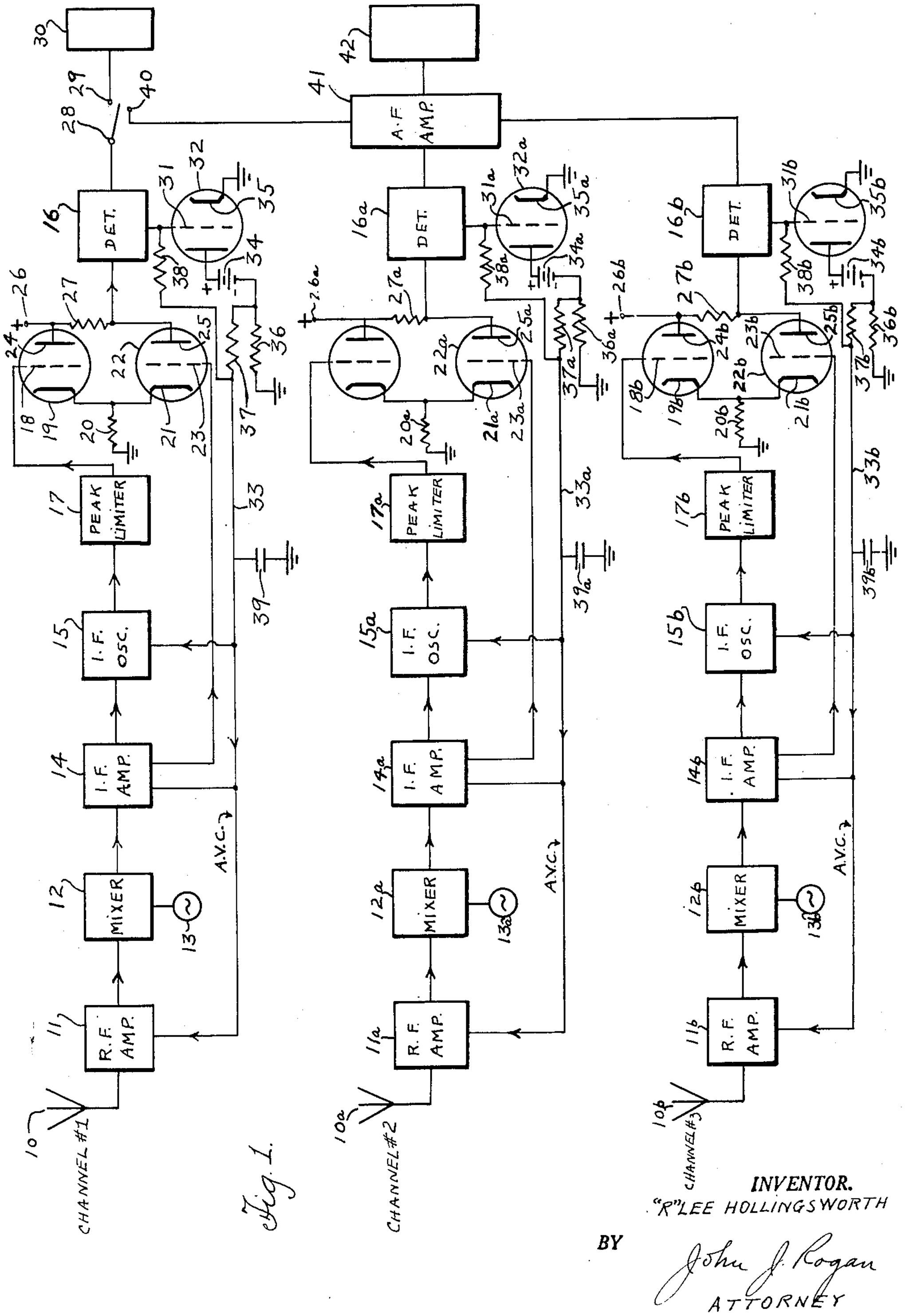
Fig. 1 is a schematic block diagram of a diversity receiving system employing the novel principles of the invention.

In as much as the main component units of a radio receiver such as a superheterodyne receiver are well-known in the art, only those portions of the system will be shown in detail sufficient to enable the inventive concept to be understood. Accordingly, in order to secure simplicity in the drawing, the known component units are illustrated diagrammatically in block outline form. In order further to simplify the explanation, those parts in the respective embodiments which are identical, bear the same designation numerals.

Referring more particularly to Fig. 1 of the drawing, there are shown three diversity receiving channels. In as much as each channel utilizes substantially the same apparatus as the other channels, detailed explanation of one channel will apply to the remaining channels. Consequently, channel #1 may comprise any well-known form of carrier wave energy pick-up or antenna 10, which is connected to a suitable radio frequency amplifier 11 and thence to a mixer unit 12 which is fed with local oscillations from a source 13, in the manner well-known in superheterodyne receiving systems. The output of unit 12 therefore consists of an intermediate frequency carrier wave having signal modulations corresponding to the signal modulations in the carrier as received by antenna 10. This intermediate frequency carrier wave is then applied to a suitable intermediate frequency amplifier 14. In accordance with the invention, the output of amplifier 14 is applied to a local oscillator 15 which is adjusted to generate a sustained carrier insertion frequency at the same frequency as the intermediate frequency from amplifier 14. Oscillator 15 may for example be of any suitable design, preferably one having close coupling between the output and input circuits so as readily to generate oscillations under control of the intermediate frequency carrier. However, in accordance with the invention, the oscillator 15 is sufficiently unstable in itself so that it is readily forced to synchronize in frequency with the frequency of the amplified intermediate frequency signals applied to it from amplifier 14. For a detailed description of an oscillator suitable for this purpose, reference may be had to Terman's Radio Engineers' Handbook, pages 514 and 515. One of the characteristics of this type of oscillator is that since its frequency is controlled by the carrier applied to it from amplifier 14, the signal modulations which appear in the intermediate frequency carrier from amplifier 14 also appear in the wave form in the output of the oscillator 15 having the effect of providing in the output of oscillator 15 an intermediate frequency carrier of the same frequency as that delivered by amplifier 14 and exhibiting an extremely low percentage modulation. If desired, these modulations can be suppressed in any well-known manner, without suppressing the local carrier generated by oscillator 15. I have found that when the level of the carrier received at antenna 1 is below some minimum level, for example 10 to 15 microvolts, it is not feasible to lock-in the insertion carrier oscillator 15 so that it synchronizes with the intermediate frequency from amplifier 14. Consequently, under such conditions, the oscillator 15 tends to wander in frequency with respect to the received carrier and this wandering appears as undesirable beats or distortion in the output of detector 16.

Assuming, for the purposes of explanation that the received radio frequency carrier is above the said minimum level, then the output of oscillator 15 may be applied to a suitable limiter device 17 for reducing or even eliminating completely the modulation components. In some cases, it may be desirable to retain a negligibly low percentage modulation in the artificially produced carrier at the output of device 15. In that event, the limiter 17 can be eliminated. Device 17 may be any well-known peak limiter device such for example as that described in Terman's Radio Engineers' Handbook, page 413.

The peak-limited output of device 17 is then applied to the control grid 18 of any suitable grid-controlled amplifier tube 19, which is provided with a suitable cathode load or follower resistance 20. The resistance 20 is also connected to the cathode 21 of another grid-controlled amplifier tube 22, whose control grid 23 is excited directly from the output of the intermediate frequency amplifier 14. By this arrangement, the cathode 21 is driven in synchronism with the potential variations developed across the cathode follower resistor 20. The anode 24 and the anode 25 are connected to the same positive D. C. potential terminal 26 of a suitable D. C. power supply through a coupling resistor 27. With this arrangement, the tubes 19 and 22 act in the nature of a mixer network for mixing the inserted carrier from device 15 with the received intermediate frequency carrier from device 14. In other words, the original signal modulations in the received radio-frequency carrier are remodulated on the local carrier from source 15. There are thus developed across the coupling resistor 27 voltages which are representative of the signal modulations in the original radio frequency carrier. These signals can then be applied to any suitable detector or rectifier 16 and the detected signals can be applied through switch arm 28 and switch contact 29 to any suitable signal reproducer or translator device 30.

So long as the received radio carrier is above a predetermined minimum level, the foregoing described arrangement acts in a manner somewhat similar to the conventional homodyne or carrier insertion radio receiver. However, and as pointed out above, if the level of the received radio carrier drops below a predetermined minimum, it is not feasible to lock-in the oscillator 15 to cause it to generate at the same frequency as the intermediate frequency carrier from device 14. Therefore, oscillator 15 will wander and will produce undesirable beats in the detector 16. In accordance with the invention, when this condition occurs, means are provided for automatically disabling or squelching the artificial carrier insertion oscillator 15. For this purpose, a portion of the detected signals from device 16 are applied to the control grid 31 of a grid-controlled vacuum tube 32, to provide an amplified automatic volume control voltage which is applied to conductor 33. When no signals are being received by the system, the tube 32 is normally plate conductive by reason of the positive plate potential 34 and the fact that the cathode 35 is directly grounded. This plate current flows through resistor 36 and produces a negative bias which is applied through resistor 37 and over conductor 33 to the control grid circuits of the devices 14 and 15. By means of this negative voltage, the tubes of devices 14 and 15 are biased substantially to plate current cutoff. The time constants of this automatic volume control circuit are controlled by resistors 37, 38, condenser 39, conductor 33, plus the by-pass condensers which are normally utilized in the grid circuits of the various tubes to which the conductor 33 is connected. In the particular example shown, this automatic volume control voltage is also applied to the amplifier tube or tubes in amplifier stage 11; to the intermediate frequency amplifier tube in stage 14, and to the intermediate frequency oscillator 15. As a result of this negative bias voltage applied to oscillator 15, this oscillator is prevented from generating intermediate frequency oscillations.

When the received radio carrier waves have a level less than the minimum above mentioned, for example 10 to 15 microvolts input, the receiver will receive and detect these weak signals directly by superheterodyne action through the intermediate frequency amplifier 14 and thence to the grid 23 and thence to the detector 16. Under these conditions, the oscillator 15 is inoperative and no local carrier is inserted.

If however, the received radio carrier signals are above the predetermined minimum level, sufficient energy will be applied to the oscillator 15 from the amplifier 14 to overcome the negative squelching voltage which is applied over conductor 33 to oscillator 15. Consequently, oscillator 15 generates oscillations and its generating frequency is determined by the frequency of the signals from amplifier 14. Under these conditions therefore, the remainder of the receiver functions in the well-known manner of a carrier insertion receiver.

When it is desired to utilize diversity reception, the switch arm 28 is closed on contact 40. As a result, a common diversity receiving amplifier 41 and a common signal reproducer 42 are connected not only to the detector 16 but also to the corresponding detectors 16*a* and 16*b* of the two other diversity receiving channels. These channels are identical with the channel #1 already described. In other words, if any given channel receives energy below a predetermined minimum, its artificial carrier oscillator 15*a* or 15*b* is automatically squelched, while on the other hand if the carrier energy received by any channel is above the said minimum, the oscillator 15*a* or 15*b* acts to produce artificial carrier of the desired amplitude to cause the corresponding diversity receiving channels to operate as a carrier insertion channel. When the system of Fig. 1 is connected for diversity reception, the artificial carrier insertion oscillators 15, 15*a* or 15*b*, supply energy which augments the effect of the automatic volume control signal in the respective channel producing an effect similar to that commonly known as amplified automatic volume control. As a result of this arrangement, during diversity reception, the particular receiving channel producing the stronger signal will not necessarily be the only channel delivering detected signal energy into the common amplifier 41 since each receiver channel is provided with its own automatic volume control and its own source of local carrier squelching voltage. However, there will always be a tendency for the strongest signal to predominate insofar as the input to amplifier 41 is concerned, since the signal voltage supplied to this amplifier from one receiver produces a biasing effect upon the plates of the rectifiers or detectors 16, 16*a*, 16*b*, or the other receivers.

Figure 2:
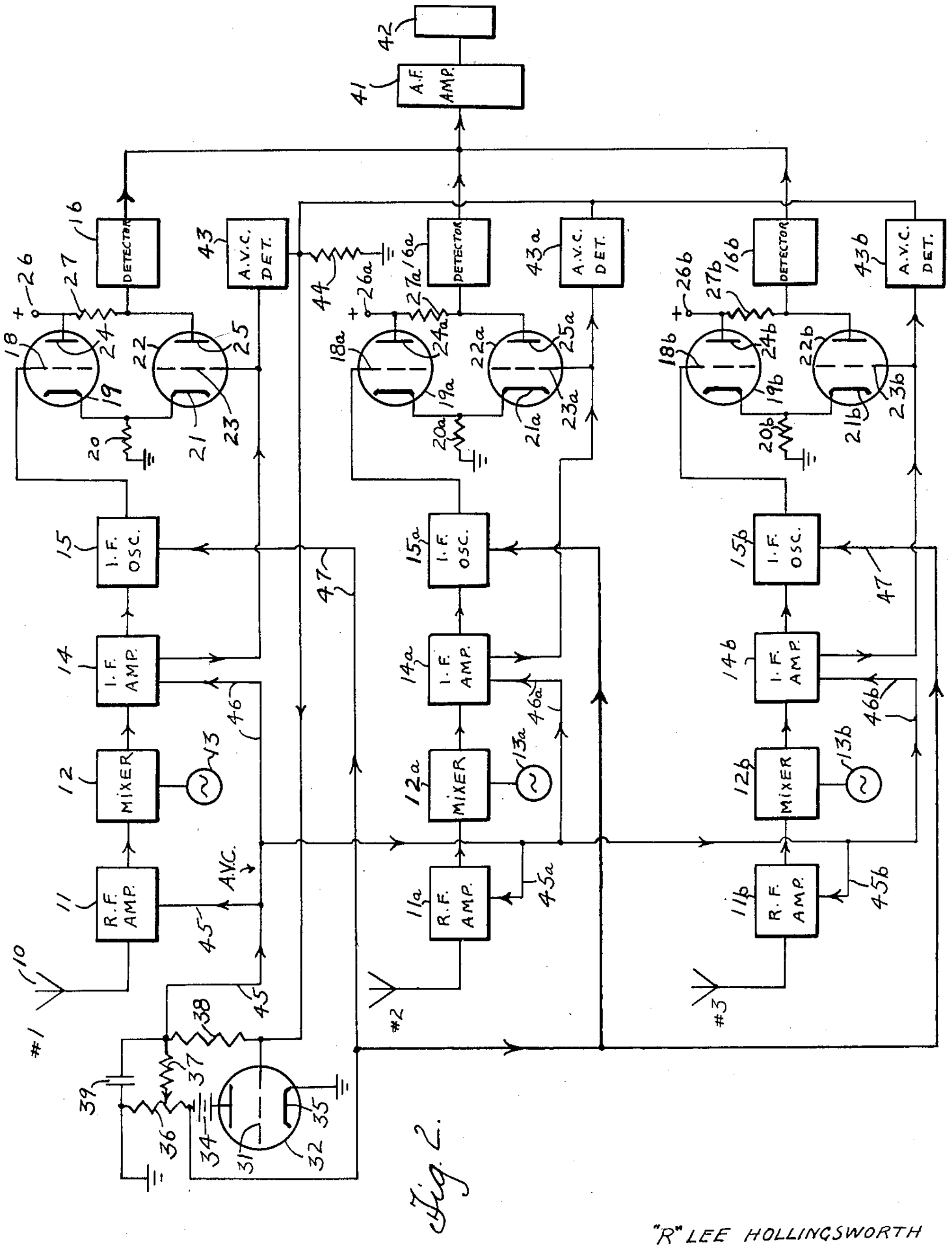
Fig. 2 is a modification of the system of Fig. 1.

Fig. 2 shows an embodiment of the invention for diversity reception wherein the outputs of the several channels 1, 2 and 3 are connected to the common amplifier 41, the output of which is utilized by translator 42. While three receiving channels are shown in this embodiment, it is understood that a greater or less number may be used.

Separate automatic volume control rectifiers 43, 43*a* and 43*b* are employed for receiving channels 1, 2 and 3 respectively. These rectifiers receive energy directly from their respective intermediate frequency amplifiers 14, 14*a* and 14*b* and their outputs are connected to the common A. V. C. rectifier load resistance 44. The output from common load resistor 44 is conveyed to control grid 31 of A. V. C. amplifier tube 32. Tube 31 functions as described in connection with Fig. 1 except that control grid 31 is only energized by one signal, namely the strongest signal from one of the receiving channels, and the output of tube 31 is conveyed to the radio frequency amplifier, intermediate frequency amplifier and intermediate frequency oscillator stages of each receiver. Connections from the common output of tube 32 to the respective radio frequency amplifiers, intermediate frequency amplifiers and intermediate frequency oscillators are indicated by conductors 45, 46 and 47 respectively. Since A. V. C. amplifier 32 is normally plate conductive and all A. V. C. signals impressed on control grid 31 from channels 1, 2 and 3 are negative, the strongest signal across resistor 44 controls the plate conductivity of tube 32.

This same amplified A. V. C. voltage is conveyed to all channels since all A. V. C. voltage is supplied by the common A. V. C. amplifier 32. If the value of the carrier received by any one of the channels is below the predetermined level such as mentioned in connection with Fig. 1, the A. V. C. voltage supplied to the radio frequency oscillator in that channel causes the associated insertion oscillator 15, 15*a*, 15*b*, to be disabled or squelched and the channel then operates as above described without the inserted carrier. When the value of the received carrier in any channel is above the predetermined minimum, it is sufficient to overcome the A. V. C. voltage supplied to the carrier insertion oscillator in that channel and that oscillator as well as the other channel oscillators become synchronized with their respective intermediate frequency amplifier and the channels operate in accordance with the insertion carrier principle.

While there has been here described preferred embodiments, it is understood that various changes and modifications may be made therein without departing from the spirit and scope of the invention.

What is claimed is:

1. In a carrier wave receiving system, means to receive a signal modulated carrier wave, a local carrier insertion generator, a modulating arrangement comprising a pair of grid-controlled electron discharge devices, means to apply the carrier from the insertion generator to the control grid of one of said devices, means to apply the received signal modulated carrier to the control grid of the other of said devices, a common load circuit for both of said devices for producing a carrier wave at the frequency of said insertion generator and bearing said signal modulations, a modulation detector connected to said load circuit, means to derive from said detector a potential corresponding to the level of the received carrier, and means to apply said potential to said insertion generator to disable said generator in response to the received carrier level dropping below a certain predetermined value.

2. In a carrier wave receiver of the type having a main carrier modulation detector and means to produce a signal modulated intermediate frequency carrier, a local oscillator generator which is synchronized by the frequency of said intermediate frequency carrier, a mixer network, means to apply the signals from said local generator to said network, means to apply the intermediate frequency carrier to said network to produce in the output of said network a carrier of the same frequency as said local generator and bearing signal modulations corresponding to those in the intermediate frequency carrier, and means to apply a disabling potential to said generator, the last-mentioned means including a detector connected to said network and a resistance network connected from said detector to said oscillator generator, said resistance network including the plate-to-cathode discharge path of a grid-controlled electron tube, and means to bias the grid of said tube in response to the received carrier signals dropping below a predetermined value said disabling potential being of sufficient magnitude to disable said local generator when the received carrier is below a level sufficient to synchronize said local oscillator but is of sufficient magnitude to produce detected signals in the output of said main detector and without disabling said main detector.

3. In a diversity radio receiving system, a plurality of diversity receiving channels each channel including a local carrier insertion oscillator, means to lock-in each oscillator under control of the received signal-modulated carrier, means in each channel for deriving an automatic volume control potential, a common combining circuit for said potentials, said circuit including a grid-controlled amplifier tube, and means connecting the output circuit of said tube in common to the carrier insertion oscillators of said channels for disabling any oscillator in response to the level of the received signal-modulated carrier dropping below a predetermined minimum.

4. A diversity receiving system according to claim 3 in which said automatic volume control amplifier is biased so as normally to be plate current conductive in the absence of carrier signals in any channel and when no channel has a received carrier which is above said predetermined level.

5. A diversity receiving system according to claim 3 in which said common automatic volume control combining circuit includes a common load resistor which is connected to supply the automatic volume control potentials to at least one amplifier stage in each channel, said load resistor being also connected to the control grid of said automatic volume control amplifier tube.

6. In a carrier wave receiving system, means to derive from received signals a signal modulated carrier, a local source of unmodulated carrier, means to synchronize said local source with the frequency of said derived carrier, electron tube means providing a pair of grid-controlled electron discharge paths, means to apply the local carrier to the control grid of one path and means to apply the derived carrier to the control grid of the other path, a common output circuit for said paths, signal modulation detector means connected to said output circuit, an automatic volume control means for applying a disabling potential to said local source in response to the level of the received carrier dropping below a predetermined value sufficient to synchronize said local source, the last-mentioned means including a grid-controlled tube which is normally plate conductive to apply said disabling potential to said local source, and means to control the plate current of said tube in accordance with a portion of the output of said detector, said pair of grid-controlled paths having their cathodes returned to ground through a common load resistor and the anodes of said pair of paths are connected together so that the plate current of one tube of said pair is modulated in accordance with the plate potentials of the other tube of said pair.

"R" LEE HOLLINGSWORTH.

REFERENCES CITED

The following references are of record in the file of this patent:

UNITED STATES PATENTS

| Number | Name | Date |
|---|---|---|
| 2,004,127 | Peterson | June 11, 1935 |
| 2,054,637 | Van Roberts | Sept. 15, 1936 |
| 2,166,298 | Jarvis | July 18, 1939 |
| 2,231,704 | Curtis | Feb. 11, 1941 |
| 2,262,218 | Andrews | Nov. 11, 1941 |